UNITED STATES PATENT OFFICE.

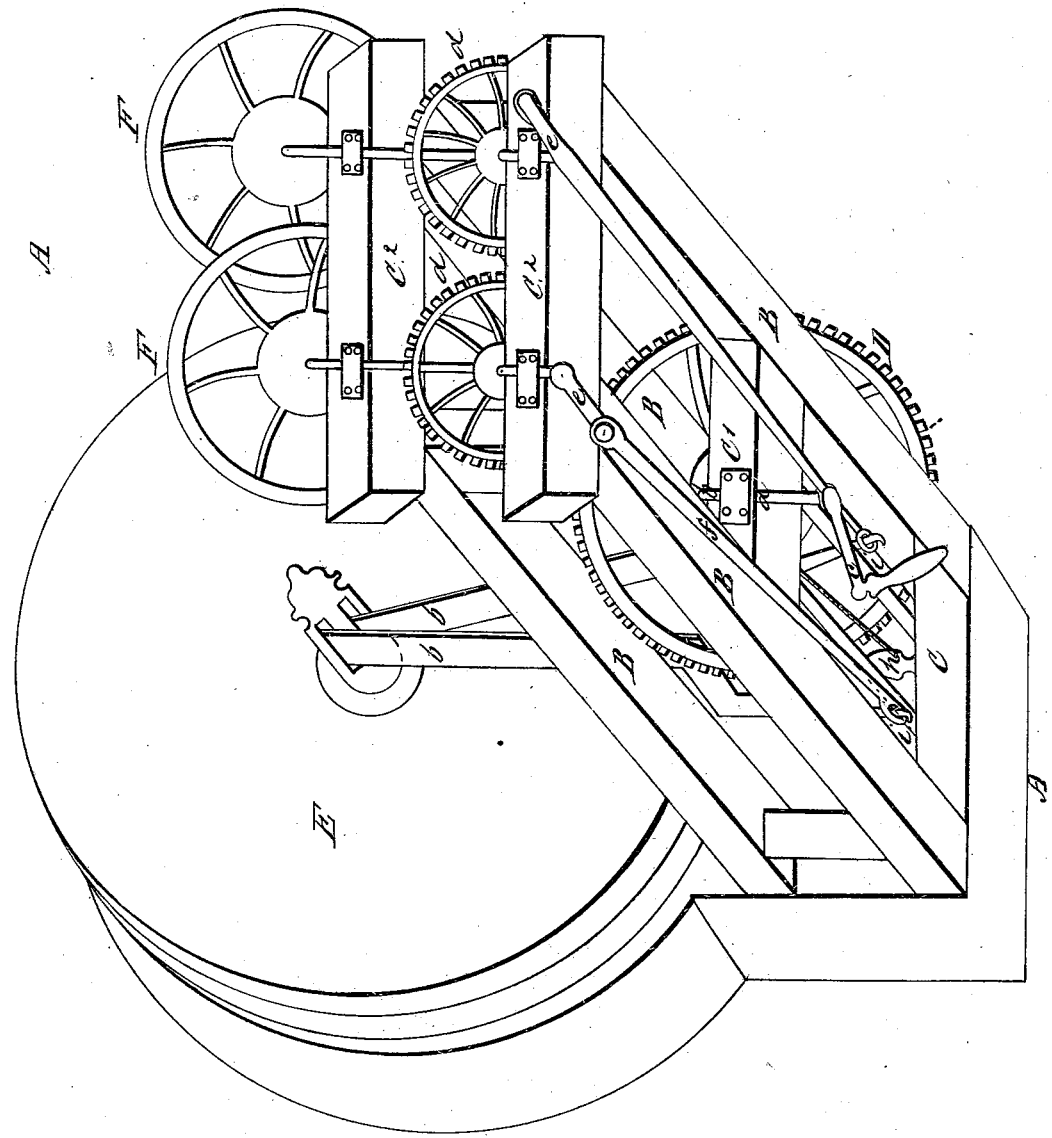

LUKE SHAW, OF BATH, MAINE.

MACHINE FOR BREAKING DOUGH.

Specification of Letters Patent No. 3,102, dated May 26, 1843.

*To all whom it may concern:*

Be it known that I, LUKE SHAW, of Bath, county of Lincoln, State of Maine, have invented a new and useful Machine for Breaking Dough Preparatory to Kneading the Same for Baking, of which the following is a full and exact description.

The nature of my invention, which I call the baker's friend, consists in applying a crank, moved by hand or other power, affixed to the axle of a cog wheel, which moves two other cog wheels, on the axle of each of which is affixed a crank, connected by a connecting rod to the outer end of a brake, the other end of which brake plays up and down in a mortise, secured by a pin or pivot, at the center of a circular platform, containing the dough, and revolving on trucks, by means of a band passing around it and over a pulley or axle, moved by another band passing over the same, and also over the first axle.

The machine is constructed by electing an upright frame, marked A, A, supported by four posts, marked B, B, B, B, in the drawing, firmly connected together by cross pieces or girts, C, C¹, C², placed at suitable distances from each other to support the axles herein described. On the middle of the girts or cross pieces marked C¹, placed little more than one third of the distance from the top toward the bottom of the posts, is to be affixed on gudgeons, marked a, the axle, marked b, of a cogwheel, D, as large as the frame will permit, to be moved by a crank, c, affixed to the outer end of said axle. On the two cross pieces C² place the axles of two other cog wheels, d, d, one on each side of the first, of the size proper to have the cog wheels mesh in with those of the first axle. On the outer end of each of these two axles is to be affixed a crank, e, attached by a connecting rod, f, to the outer end of a brake, marked l, the other or inner end of which plays vertically by a tenon secured in a mortise, g, at the center of a circular dough platform, marked E, by a pin or pivot, so that the outer end of the brake may be alternately lifted up by the motion of the crank, and again pressed down firmly upon the dough which may have passed under it. These brakes are kept in place by being passed through slides or mortises, i, i, affixed to the posts. The platform is made to revolve slowly, so as to present different portions of the dough to pressure, by means of a band passing around it and also over and around a roller, axle or pulley whose ends are inserted into the lower cross pieces, nearly level with the platform; the band passing first around rollers inserted into the upper and lower crosspieces, at equal distances on each side of the axle, and at a distance from each other nearly equal to the diameter of the platform, for the purpose of keeping the band in place on the axle or pulley; this last axle being moved by a band passing around it and also around the first axle. On the other end of the axles of the two upper cog wheels should be affixed fly wheels, F, F, to regulate the motion. Instead of the band, cogs on the platform and axle intended to move it, may be substituted.

Another mode of operation is that of having a fixed semicircular or quadrant platform, and causing the frame to move on trucks slowly from one corner to the other each way, by a line or band attached by each end to the wall of the room on each side, and passing around the axle, so that the motion of the crank one way will cause the frame to move in that direction, and its motion the other way will cause the frame to move back again; thus passing the brake at will over the dough on any part of the platform.

What I claim as my invention, and desire to secure by Letters Patent, is—

The arrangement of the table or platform, and breaker, in combination with the cranks and cog gearing arranged and operating in the manner herein described.

LUKE SHAW.

Witnesses:
BENJA. RANDALL,
SARAH JAMESON.